United States Patent
Beattie et al.

(10) Patent No.: US 9,970,537 B2
(45) Date of Patent: May 15, 2018

(54) LOCK ASSEMBLY FOR SHIFTER

(71) Applicant: Dura Operating, LLC, Auburn Hills, MI (US)

(72) Inventors: Dale Alan Beattie, Norten Shores, MI (US); Alberto Polonio Morales, West Bloomfield, MI (US)

(73) Assignee: DURA Operating, LLC, Auburn Hills, MI (US)

( * ) Notice: Subject to any disclaimer, the term of this patent is extended or adjusted under 35 U.S.C. 154(b) by 257 days.

(21) Appl. No.: 15/012,410

(22) Filed: Feb. 1, 2016

(65) Prior Publication Data

US 2017/0219095 A1    Aug. 3, 2017

(51) Int. Cl.
| | | |
|---|---|---|
| B60K 20/00 | (2006.01) | |
| G05G 5/00 | (2006.01) | |
| F16H 61/22 | (2006.01) | |
| F16H 59/02 | (2006.01) | |
| F16H 59/10 | (2006.01) | |

(52) U.S. Cl.
CPC ......... *F16H 61/22* (2013.01); *F16H 59/0278* (2013.01); *F16H 59/10* (2013.01); *F16H 2059/0282* (2013.01); *F16H 2061/223* (2013.01)

(58) Field of Classification Search
CPC ............. F16H 61/22; F16H 2059/0282; F16H 2061/223
See application file for complete search history.

(56) References Cited

U.S. PATENT DOCUMENTS

| | | | | |
|---|---|---|---|---|
| 5,314,049 | A * | 5/1994 | Nordstrom | F16H 59/10 180/271 |
| 5,577,418 | A | 11/1996 | Traxler et al. | |
| 5,797,295 | A * | 8/1998 | Kataumi | F16H 59/10 192/220.3 |
| 6,009,769 | A * | 1/2000 | Ikegami | F16H 59/10 192/220.4 |
| 2003/0097897 | A1* | 5/2003 | Yamada | F16H 59/0204 74/473.21 |
| 2006/0117893 | A1* | 6/2006 | Shimizu | F16H 59/10 74/473.21 |
| 2008/0034913 | A1* | 2/2008 | Takikawa | F16H 59/0278 74/473.33 |
| 2015/0362067 | A1 | 12/2015 | Mitteer et al. | |

FOREIGN PATENT DOCUMENTS

EP          748958 A2    8/2000

* cited by examiner

*Primary Examiner* — Jake Cook
(74) *Attorney, Agent, or Firm* — Robert E. Ford; Raymond J. Vivacqua; Steven L. Crane

(57) ABSTRACT

A shifter assembly for a motor vehicle includes a housing, a detent gate connected to the housing, a shifter lever moveable between at least a park position and a neutral position, a locking button movably supported by the shifter lever that contacts the detent gate when in a first position and that spaces apart from the detent gate when depressed to a second position, and a pawl moveable between an unlock position and a lock position. The pawl prevents the shifter lever from moving out of the park or neutral positions and prevents the locking button from being depressed when in the lock position.

19 Claims, 6 Drawing Sheets

LOCK ASSEMBLY FOR SHIFTER

FIELD

The invention relates generally to a lock assembly for a shifter in a motor vehicle, and more particularly to a multi-position lock assembly having a single actuating device for a shifter.

BACKGROUND

The statements in this section merely provide background information related to the present disclosure and may or may not constitute prior art.

In a motor vehicle equipped with an automatic transmission, a shifter mechanism typically includes a shifter or control lever mounted within the motor vehicle's passenger compartment. The shifter lever is used by an operator of the motor vehicle to select one of a plurality of transmission operating modes. For example, these transmission operating modes may include park (P), reverse (R), neutral (N), drive (D), and may, in some configurations, include a low gear or manual mode (M), manual shift up (M+), and manual shift down (M−). To select transmission modes, the operator of the motor vehicle moves the shifter lever about an axis of rotation corresponding to the P, R, N, D positions. The shifter lever may, in some configurations, also be moveable about a second axis of rotation corresponding to the M, M+, M− positions.

In order to prevent the shifter lever from being accidentally moved to a position not intended by the operator of the motor vehicle, the shifter mechanism includes either, or both, a button lock and a lever lock. The button lock typically includes a feature that engages a detent gate to prevent the shifter lever from moving from the neutral position to the park position unless a button is depressed. The lever lock typically includes locking arm that engages the shifter lever to prevent the shifter lever from moving from the park position to the neutral position. A solenoid selectively moves the locking arm out of engagement with the shifter lever when the brakes have been engaged by the operator of the motor vehicle. While these systems are useful for their intended purpose, there is a need in the art for improved locking mechanisms that do not increase the cost packaging of the shifter mechanism while further providing additional redundant safety features.

SUMMARY

A shifter assembly for a motor vehicle is provided. The shifter assembly includes a housing, a detent gate connected to the housing, a shifter lever moveable between at least a park position and a neutral position, a locking button movably supported by the shifter lever that contacts the detent gate when in a first position and that spaces apart from the detent gate when depressed to a second position, and a pawl moveable between an unlock position and a lock position. The pawl prevents the shifter lever from moving out of the park or neutral positions and prevents the locking button from being depressed when in the lock position.

In one aspect, the pawl includes a first portion and a second portion, and the first portion selectively contacts the shifter lever and the second portion selectively contacts the locking button.

In another aspect, the shifter lever includes a slot and the first portion of the pawl is disposed within the slot when the pawl is in the lock position and the shifter lever is in the neutral position.

In another aspect, the first portion of the pawl contacts a side surface of the shifter lever when the shifter lever is in the park position and the pawl is in the lock position.

In another aspect, the second portion of the pawl includes a first surface offset from a second surface.

In another aspect, the first surface of the pawl contacts the locking button when the shifter lever is in the park position and the pawl is in the lock position.

In another aspect, the second surface of the pawl contacts the locking button when the shifter lever is in the neutral position and the pawl is in the lock position.

In another aspect, the pawl is pivotally mounted to the housing and is actuated by a solenoid.

In another aspect, the locking button includes a first arm that extends through a first window disposed in the shifter lever, and wherein the first arm contacts the detent gate when in the first position.

In another aspect, the locking button includes a second arm that extends through a second window disposed in the shifter lever, and wherein the second arm selectively contacts the pawl when the pawl is in the lock position.

Another shifter assembly for a motor vehicle is provided. The shifter assembly includes a housing, a detent member connected to the housing, a shifter lever moveable between at least a first gear position and a second gear position, a locking member movable between a first position that contacts with the detent member and a second position free from contact with the detent member, and a pawl moveable between an unlock position and a lock position. The pawl includes a first portion and a second portion. When the pawl is in the lock position the first portion selectively contacts the shifter lever to prevent the shifter lever from moving out of the first gear position and the second portion selectively contacts the locking member to prevent the locking member from being placed in the second position.

In one aspect, the locking member moves along a first axis concentric with the shifter lever and the shifter lever pivots about a second axis perpendicular to the first axis.

In another aspect, the pawl has a first end and a second end opposite the first end and the pawl is pivotally connected to the housing between the first end and the second end.

In another aspect, a solenoid is connected to the first end of the pawl for moving the pawl between the lock position and the unlock position.

In another aspect, the first and second portions are disposed on the second end.

In another aspect, the first portion extends parallel to the second axis and the second portion extends parallel to the first axis.

In another aspect, the shifter lever includes a slot and the first portion is disposed within the slot when the pawl is in the lock position and the shifter lever is in the second gear position and the first portion contacts a side surface of the shifter lever when the shifter lever is in the first gear position and the pawl is in the lock position.

In another aspect, the second portion includes a first surface offset substantially in the direction of the first axis from a second surface.

In another aspect, the locking member includes a first arm that extends perpendicular to the first axis through a first window disposed in the shifter lever, wherein the first arm engages with the detent member when in the first position, and the locking member includes a second arm that extends perpendicular to the first axis through a second window disposed in the shifter lever, wherein the second arm selectively contacts the pawl when the pawl is in the lock position.

Further aspects, examples, and advantages will become apparent by reference to the following description and appended drawings wherein like reference numbers refer to the same component, element or feature.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
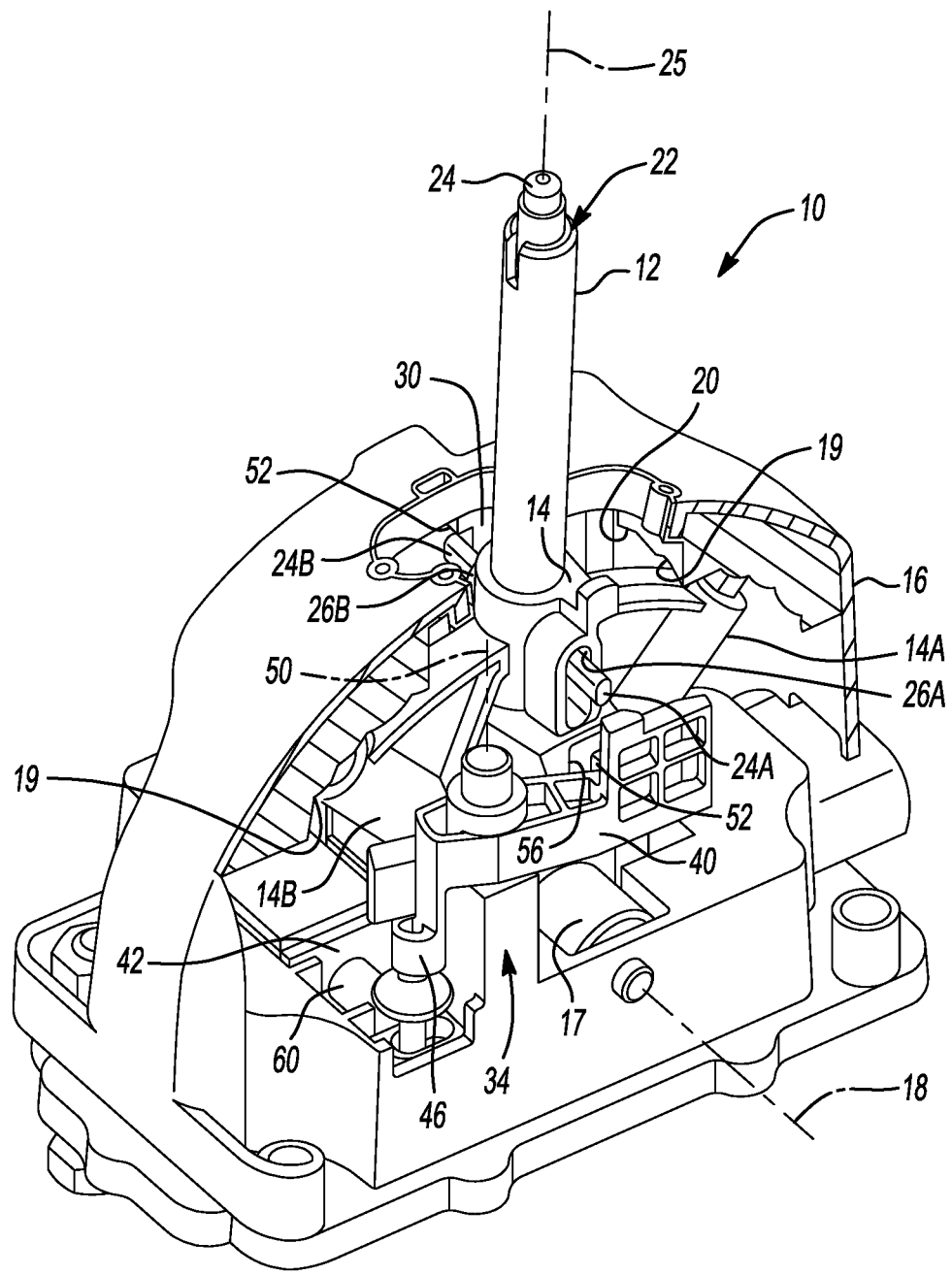
FIG. 1 is a side perspective view of a shifter assembly in a first, unlocked position.

With reference to FIG. 1, a shifter assembly is generally indicated by reference number 10 and is illustrated in a neutral, energized position, as will be described below. The shifter assembly 10 is employed within a motor vehicle (not shown). The shifter assembly 10 is controlled by an operator of the motor vehicle to select one of a plurality of shift positions. Each of the shift positions corresponds to an operating mode of a transmission (not shown) associated with the shifter assembly 10 and the motor vehicle. In the example provided, the shifter assembly 10 includes a park (P), reverse (R), neutral (N), and drive (D). It should be appreciated that the number of shift positions, as well as the associated transmission operating mode, may vary without departing from the scope of the present example. For example, the shifter assembly 10 may also include manual modes M, M+, and M− and/or high gear and low gear operating modes.

The shifter assembly 10 generally includes a shifter lever 12 having a support collar 14. The shifter lever 12 is connectable to a shift knob (not shown) that is useable by an operator of the motor vehicle. The support collar 14 is pivotally mounted to a shifter housing 16 at a ball bearing or pivot point 17. The shifter housing 16 encloses and protects the components of the shifter assembly 10. The shifter lever 12 and support collar 14 are capable of pivoting or rotating about a pivot axis 18 at the pivot point 17. The support collar 14 includes detent arms 14A, 14B that engage a plurality of detents 19 located on an inner surface 20 of the shifter housing 16. The detents 19 are positioned in the shifter housing 16 to provide a mechanical detent to each of the plurality of shift positions of the shifter lever 12 and support collar 14.

A button lock mechanism 22 is connected to the shifter lever 12. The button lock mechanism 22 prevents the shifter lever 12 and the support collar 14 from pivoting to the park position from the neutral position, as will be described below. The button lock mechanism 22 includes a button lock 24 disposed within the shifter lever 12. The button lock 24 is depressible within the shifter lever 12, i.e., the button lock 24 is translatable along an axis 25 of the shifter lever 12. The button lock 24 includes a first lock arm 24A and a second lock arm 24B. The first lock arm 24A extends out through a first window 26A disposed in the support collar 14. The second lock arm 24B extends out through a second window 26B disposed on an opposite side of the support collar 14 than the first window 26A. Each of the first and second lock arms 24A, 24B are configured to selectively engage detent gates 30 (only one of which is shown) on each side of the shifter lever 12. The detent gates 30 are mounted to the shifter housing 16. The detent gates 30 have a stepped face 32 that limits movement of the shifter lever 12 from the neutral position to the park position. For example, in a rest state where the operator of the motor vehicle 12 is not depressing the lock button 24, the lock button 24 is biased upwards by any suitable biasing member (not shown), such as a coil spring, to a first position. When the lock button 24 is not depressed, the lock arms 24A, 24B are also in the first position where each of the lock arms 24A, 24B engage the stepped face 32 of the detent gates 30, thus preventing the shifter lever 12 from moving from the neutral position to the park position. When the lock button 24 is depressed, the lock arms 24A, 24B move downwards to a second position away from the detent gates 30 and do not engage the stepped face 32, thus allowing the shifter lever 12 to move from the neutral position to the park position.

The shifter assembly 10 further includes a pawl lock mechanism 34. The pawl lock mechanism 34 selectively prevents the shifter lever 12 and support collar 14 from moving between the park and neutral positions while simultaneously preventing the lock button 24 from being depressed from the first position to the second position. The pawl lock mechanism 34 includes a pawl 40 actuated by an actuator 42.

Figure 2:
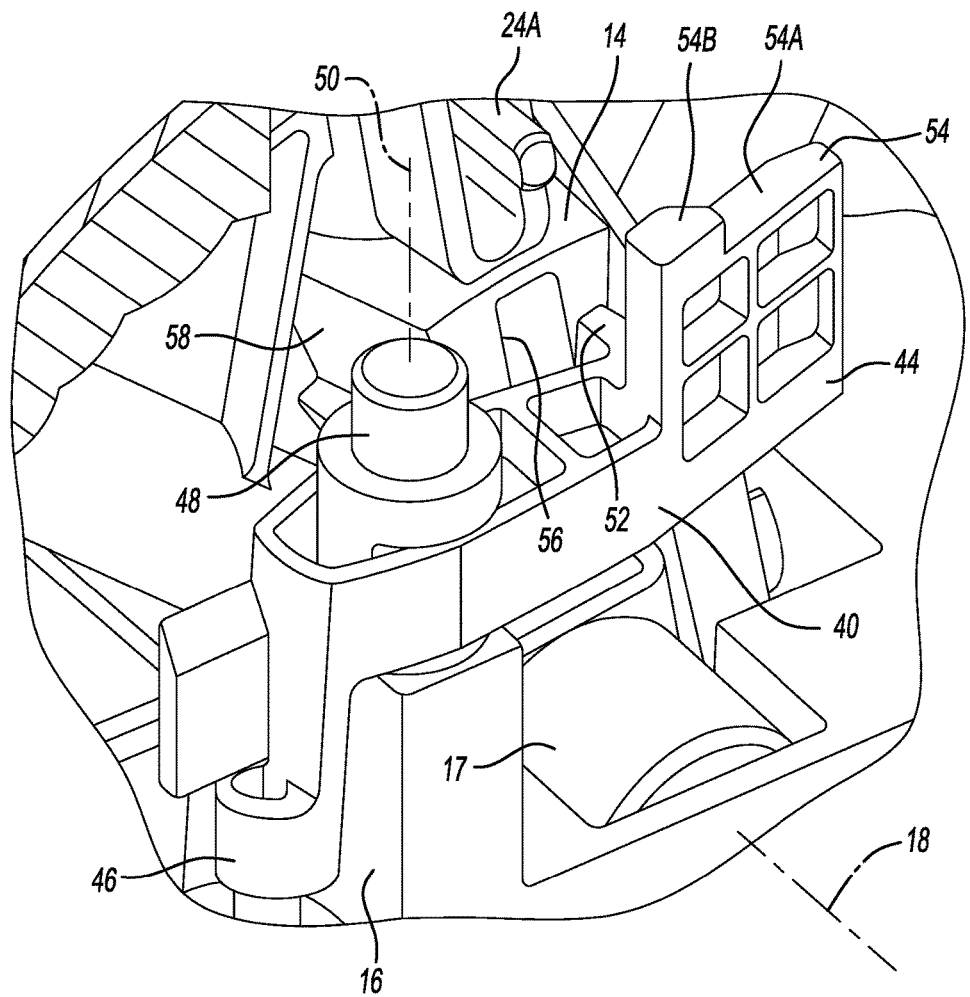
FIG. 2 is an enlarged, side perspective view of a portion of the shifter assembly shown in FIG. 1.

Turning now to FIG. 2, the pawl 40 includes a first end 44 and a second end 46 opposite the first end 44. The pawl 40 is pivotally mounted to the shifter housing 16 at a pivot point 48. The pivot point 48 is disposed between the first end 44 and the second end 46 of the pawl 40. The pawl 40 pivots about an axis 50. The axis 50 is perpendicular to the pivot axis 18 of the shifter lever 12 and support collar 14.

The first end 44 of the pawl 40 includes a first portion or tab 52 and a second portion or blocker 54. The tab 52 is oriented perpendicular to the blocker 54 and extends from the blocker 54 toward the support collar 14. The tab 52 is configured to engage a slot 56 defined in the support collar 14 and a side surface 58 on the support collar 14, depending on the position of the shifter lever 12 and the support collar 14. The slot 56 is disposed on a same side as the first window 26A. The slot 56 is disposed along the axis 25 between the pivot point 17 and the first window 25A. The side surface 58 is disposed adjacent the slot 56.

The blocker 54 includes a first surface 54A offset from a second surface 54B thus creating a stepped profile. The blocker 54 is configured to selectively contact or engage the first lock arm 24A when the shifter lever 12 and support collar 14 are in different positions which changes the height of the first lock arm 24A relative to the pawl 40. For example, the second surface 54B is raised with respect to the first surface 54A and is disposed on the pawl 40 between the pivot point 48 and the first surface 54A.

Returning to FIG. 1 and with continued reference to FIG. 2, the actuator 42 includes an armature 60 pivotally connected to the second end 46 of the pawl 40. The actuator 42 is preferably an on/off solenoid where, upon receipt of a control signal, the solenoid is energized and the armature 60 is translated. Translation of the armature 60 in turn pivots the pawl 40 about the pivot axis 50. However, it should be appreciated that the actuator 42 may take other forms without departing form the scope of the present example. The actuator 42 may be electronically controlled by a controller, such as a transmission control module or brake control module, etc., and commanded to energize when the brakes of the motor vehicle are depressed.

Figure 3:
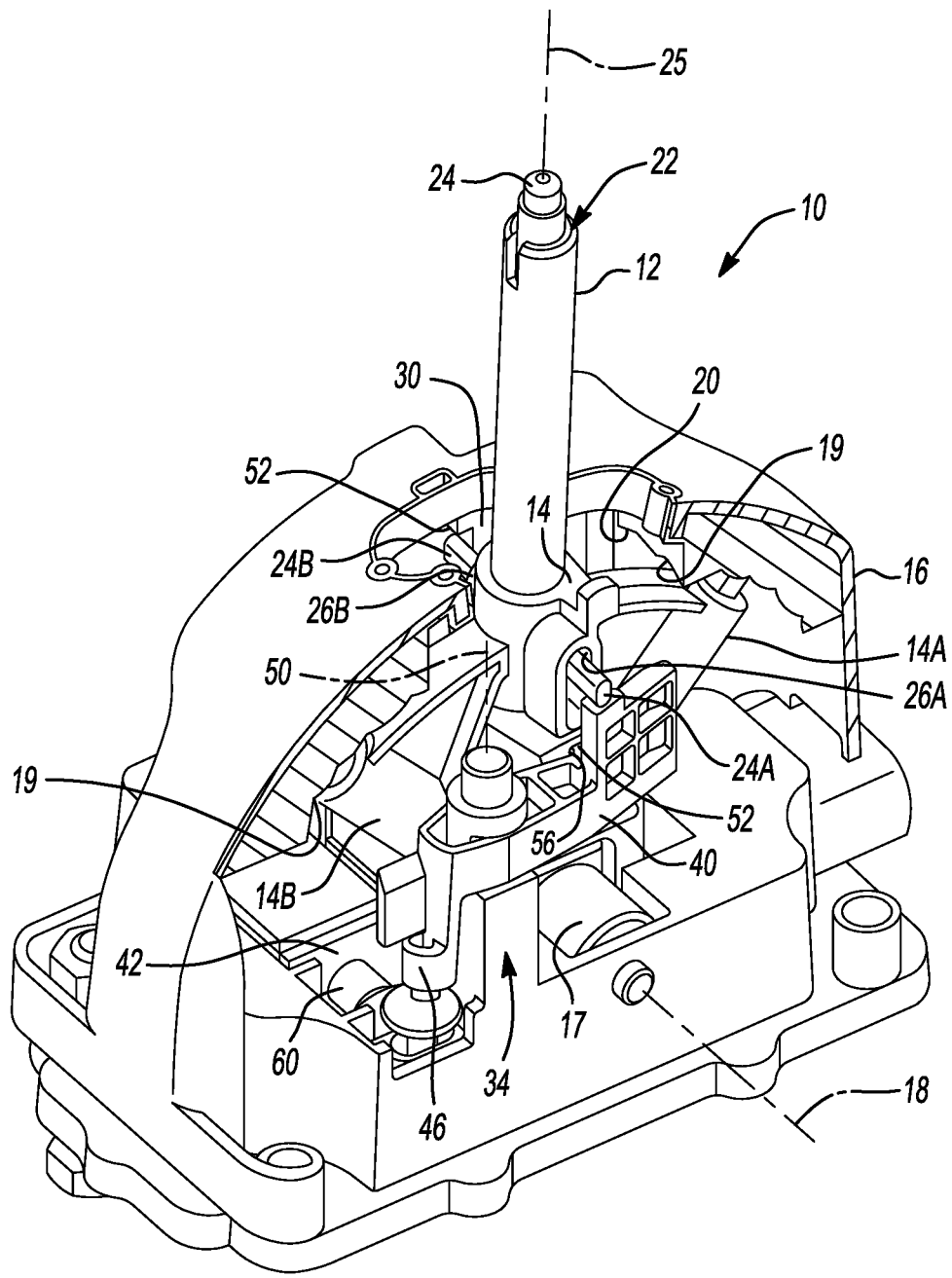
FIG. 3 is a side perspective view of a shifter assembly in a first, locked position.
Figure 4:
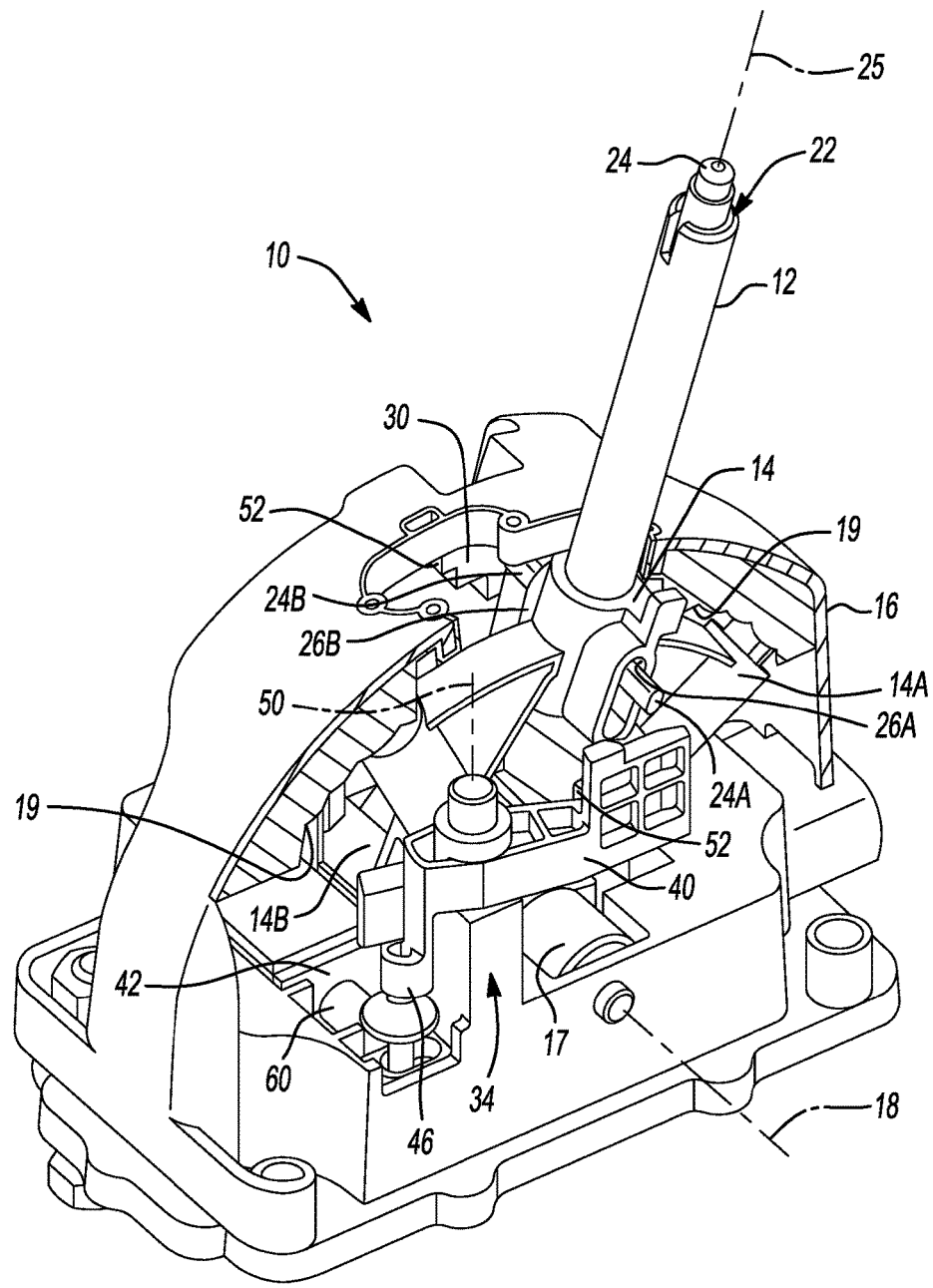
FIG. 4 is a side perspective view of a shifter assembly in a second, unlocked position.
Figure 5:
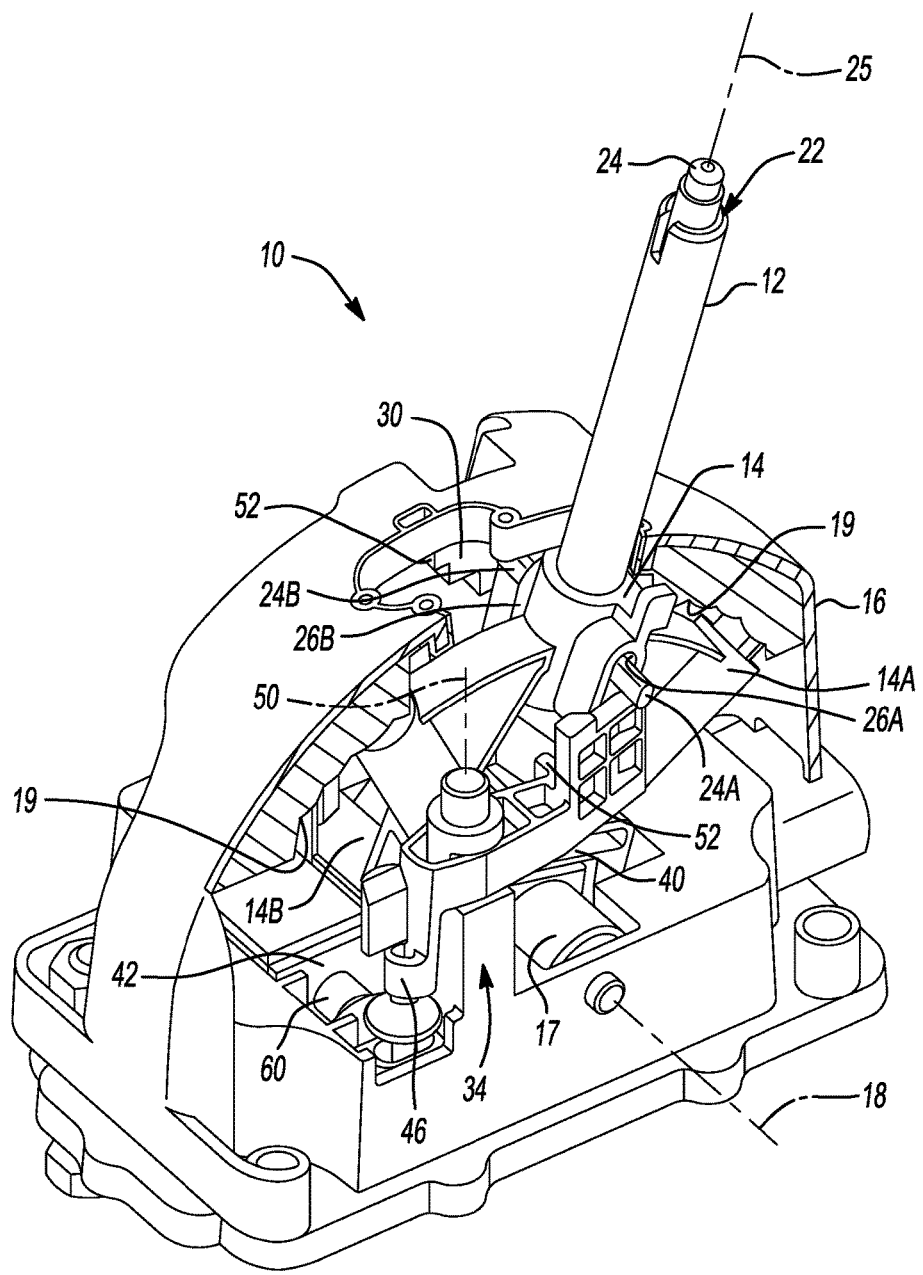
FIG. 5 is a side perspective view of a shifter assembly in a second, locked position.
Figure 6:
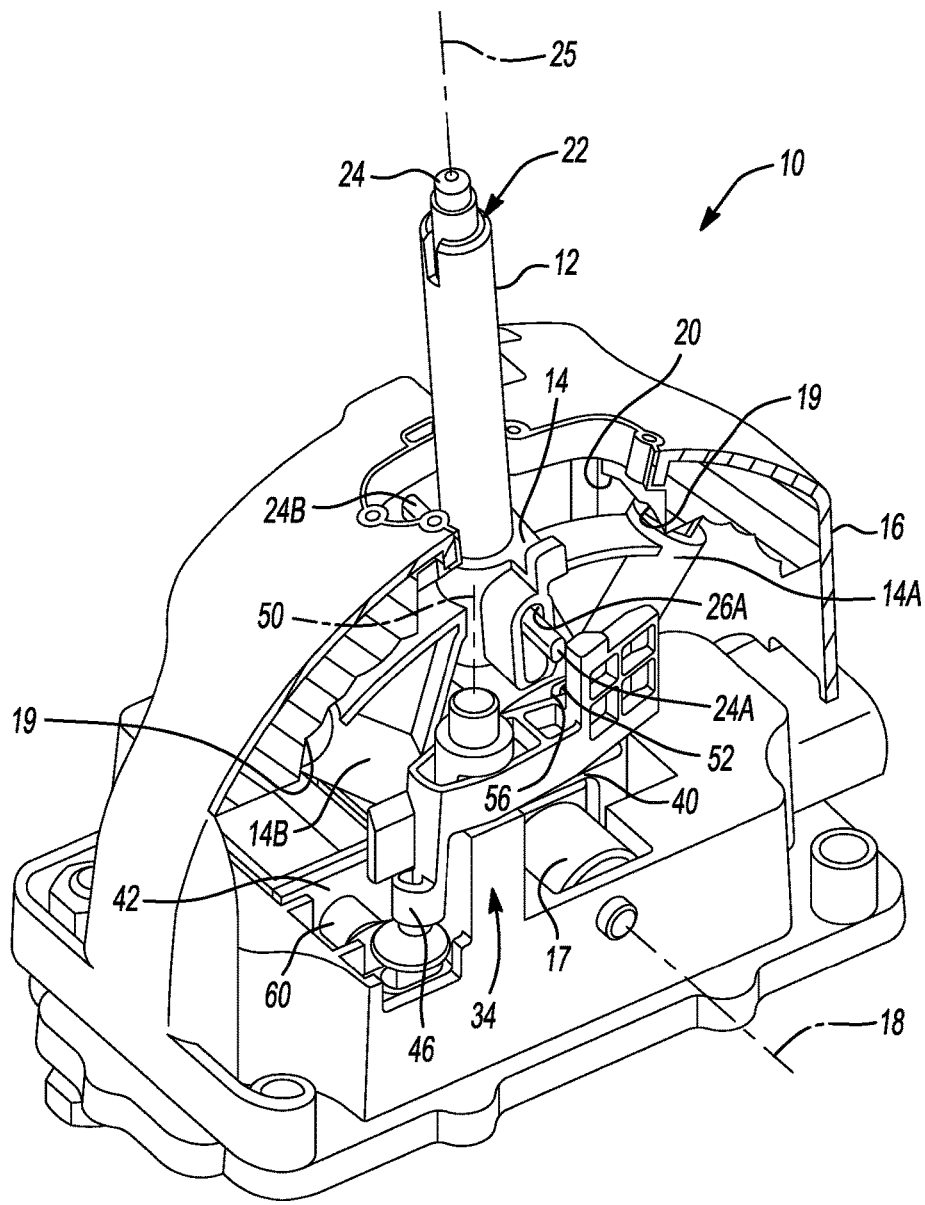
FIG. 6 is a side perspective view of a shifter assembly in a third position.

The pawl 40 is movable between an unlocked or energized position, shown in FIGS. 1, 2, and 4, and a locked or de-energized position, shown in FIGS. 3, 5, and 6. FIG. 1 shows the shifter lever 12 in the neutral position with the pawl 40 in the unlocked position. In this condition, the pawl 40 does not engage the support collar 14 nor the lock button 24. To move the shifter lever 12 to a drive position, shown in FIG. 6, the operator of the motor vehicle need only move the shifter lever 12 rearwards, i.e. away from the detent gate 30. However, to move the shifter lever 12 to a reverse position (not shown) or a park position (shown in FIGS. 4 and 5), the lock button 24 must be depressed to move the lock arms 24A, 24B out of alignment and engagement with the detent gate 30 before moving the shifter lever 12 forwards, i.e., towards the detent gate 30.

FIG. 3 shows the shifter lever 12 in the neutral position with the pawl 40 in the locked position. In this condition, the pawl 40 engages both the support collar 14 and the first lock arm 24A. For example, the tab 52 of the pawl 40 is disposed in the slot 56 and the second surface 54B of the blocker 54 is in contact with the first lock arm 24A. The tab 52 prevents the shifter lever 12 from pivoting about the axis 18 while the blocker 54 blocks the lock button 24 form being depressed, thus providing extra redundancy.

FIG. 4 shows the shifter lever 12 in the park position with the pawl 40 in the unlocked position. In this condition, the pawl 40 does not engage the support collar 14 nor the lock button 24. However, the locking arms 24A, 24B are disposed on an opposite side of the detent gate 30. Thus, to move the shifter lever 12 to the drive position, neutral position, or reverse position, the operator of the motor vehicle must depress the lock button 24 to move the lock arms 24A, 24B out of alignment and engagement with the detent gate 30 before moving the shifter lever 12.

FIG. 5 shows the shifter lever 12 in the park position with the pawl 40 in the locked position. In this condition, the pawl 40 engages both the support collar 14 and the first lock arm 24A. For example, the tab 52 of the pawl 40 is in contact with the side surface 58 and the first surface 54A of the blocker 54 is in contact with the first lock arm 24A. The tab 52 prevents the shifter lever 12 from pivoting about the axis 18 while the blocker 54 blocks the lock button 24 form being depressed, thus providing extra redundancy.

Finally, FIG. 6 shows the shifter lever 12 in the drive position. In this position, the pawl 40 does not inhibit movement of the shifter lever 12 nor the lock button 24.

The description of the invention is merely exemplary in nature and variations that do not depart from the gist of the invention are intended to be within the scope of the invention. Such variations are not to be regarded as a departure from the spirit and scope of the invention.

The following is claimed:

1. A shifter assembly comprising:
    a housing;
    a detent gate connected to the housing;
    a shifter lever moveable between at least a park position and a neutral position;
    a locking button movably supported by the shifter lever that contacts the detent gate when in a first position and that spaces apart from the detent gate when depressed to a second position; and
    a pawl moveable between an unlock position and a lock position, wherein the pawl includes a first portion and a second portion, wherein the first portion contacts the shifter lever and the second portion contacts the locking button when in the lock position, and wherein the pawl prevents the shifter lever from moving out of the park or neutral positions and prevents the locking button from being depressed when in the lock position.

2. The shifter assembly of claim 1 wherein the shifter lever includes a slot and the first portion of the pawl is disposed within the slot when the pawl is in the lock position and the shifter lever is in the neutral position.

3. The shifter assembly of claim 1 wherein the first portion of the pawl contacts a side surface of the shifter lever when the shifter lever is in the park position and the pawl is in the lock position.

4. The shifter assembly of claim 1 wherein the second portion of the pawl includes a first surface offset from a second surface.

5. The shifter assembly of claim 4 wherein the first surface of the pawl contacts the locking button when the shifter lever is in the park position and the pawl is in the lock position.

6. The shifter assembly of claim 4 wherein the second surface of the pawl contacts the locking button when the shifter lever is in the neutral position and the pawl is in the lock position.

7. The shifter assembly of claim 1 wherein the pawl is pivotally mounted to the housing and is actuated by a solenoid.

8. The shifter assembly of claim 1 wherein the locking button includes a first arm that extends through a first window disposed in the shifter lever, and wherein the first arm contacts the detent gate when in the first position.

9. The shifter assembly of claim 8 wherein the locking button includes a second arm that extends through a second window disposed in the shifter lever, and wherein the second arm selectively contacts the pawl when the pawl is in the lock position.

10. A shifter assembly for a motor vehicle comprising:
    a housing;
    a detent member connected to the housing;
    a shifter lever moveable between at least a first gear position and a second gear position;
    a locking member movable between a first position that contacts with the detent member and a second position free from contact with the detent member; and
    a pawl moveable between an unlock position and a lock position, wherein the pawl includes a first portion and a second portion and when the pawl is in the lock position the first portion contacts the shifter lever to prevent the shifter lever from moving out of the first gear position and the second portion contacts the locking member to prevent the locking member from being placed in the second position.

11. The shifter assembly of claim 10 wherein the locking member moves along a first axis concentric with the shifter lever and the shifter lever pivots about a second axis perpendicular to the first axis.

12. The shifter assembly of claim 11 wherein the pawl has a first end and a second end opposite the first end and the pawl is pivotally connected to the housing between the first end and the second end.

13. The shifter assembly of claim 12 further comprising a solenoid connected to the first end of the pawl for moving the pawl between the lock position and the unlock position.

14. The shifter assembly of claim 13 wherein the first and second portions are disposed on the second end.

15. The shifter assembly of claim 14 wherein the first portion extends parallel to the second axis and the second portion extends parallel to the first axis.

16. The shifter assembly of claim 15 wherein the shifter lever includes a slot and the first portion is disposed within the slot when the pawl is in the lock position and the shifter lever is in the second gear position and the first portion contacts a side surface of the shifter lever when the shifter lever is in the first gear position and the pawl is in the lock position.

17. The shifter assembly of claim 15 wherein the second portion includes a first surface offset substantially in the direction of the first axis from a second surface.

18. The shifter assembly of claim 17 wherein the locking member includes a first arm that extends perpendicular to the first axis through a first window disposed in the shifter lever, wherein the first arm engages with the detent member when in the first position, and the locking member includes a second arm that extends perpendicular to the first axis through a second window disposed in the shifter lever, wherein the second arm selectively contacts the pawl when the pawl is in the lock position.

19. An assembly for a motor vehicle comprising:
a shifter lever moveable between at least a park position and a neutral position;
a locking button mounted within the shifter lever that locks movement of the shifter lever when in a first position and that unlocks movement of the shifter lever when depressed to a second position; and
a pawl moveable between an unlock position and a lock position, wherein the pawl includes a tab and a stepped surface and when the pawl is in the lock position the tab contacts the shifter lever to prevent the shifter lever from moving out of the park or neutral positions and the stepped surface contacts the locking button to prevent the locking button from being depressed when the shifter lever is in the park or neutral positions.

\* \* \* \* \*